May 4, 1948.  L. L. HERCIK  2,440,799
ALLIGATOR SHEAR CONTROL APPARATUS
Filed Jan. 24, 1946  5 Sheets-Sheet 1

INVENTOR:
LAD L. HERCIK
BY
ATTORNEY.

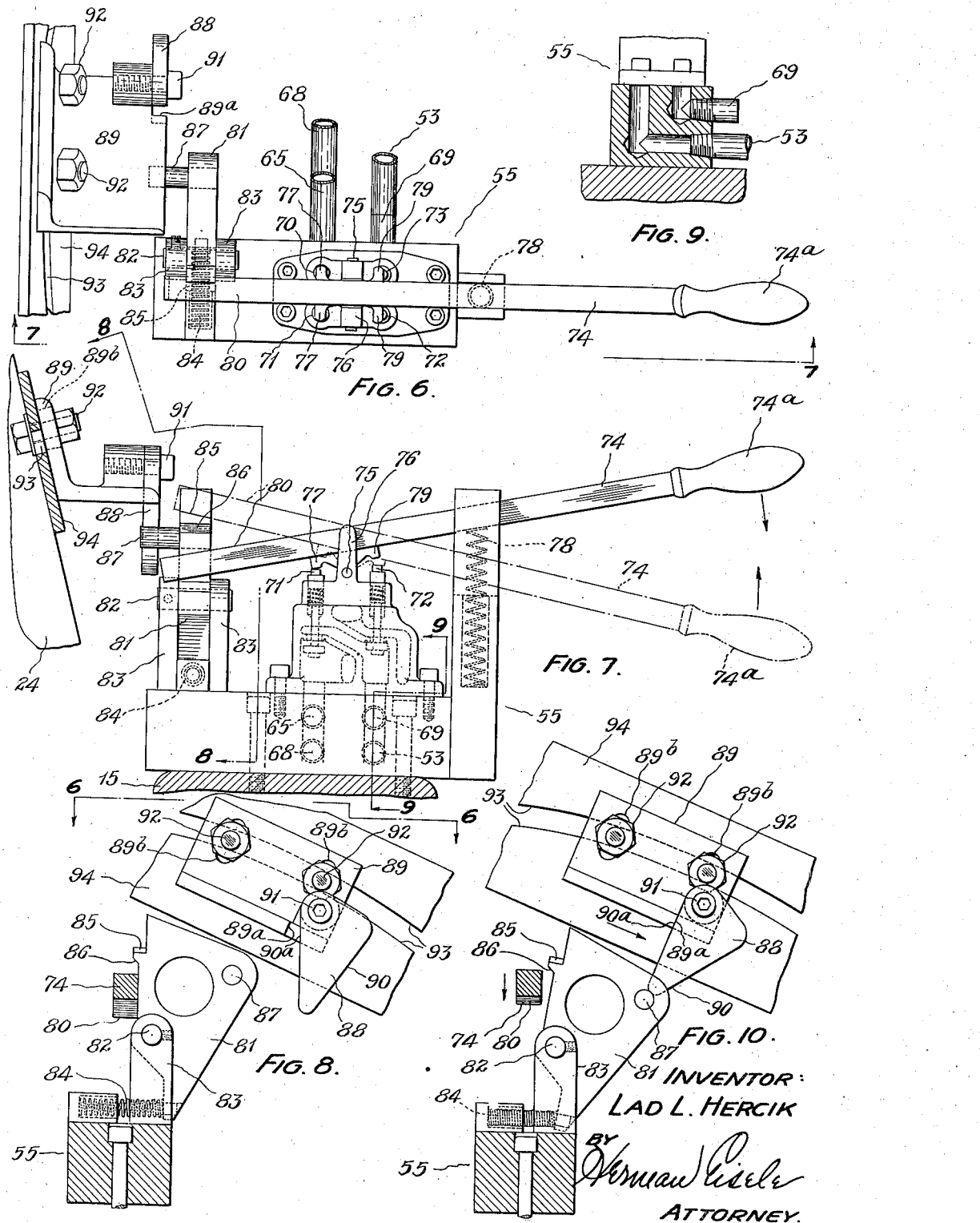

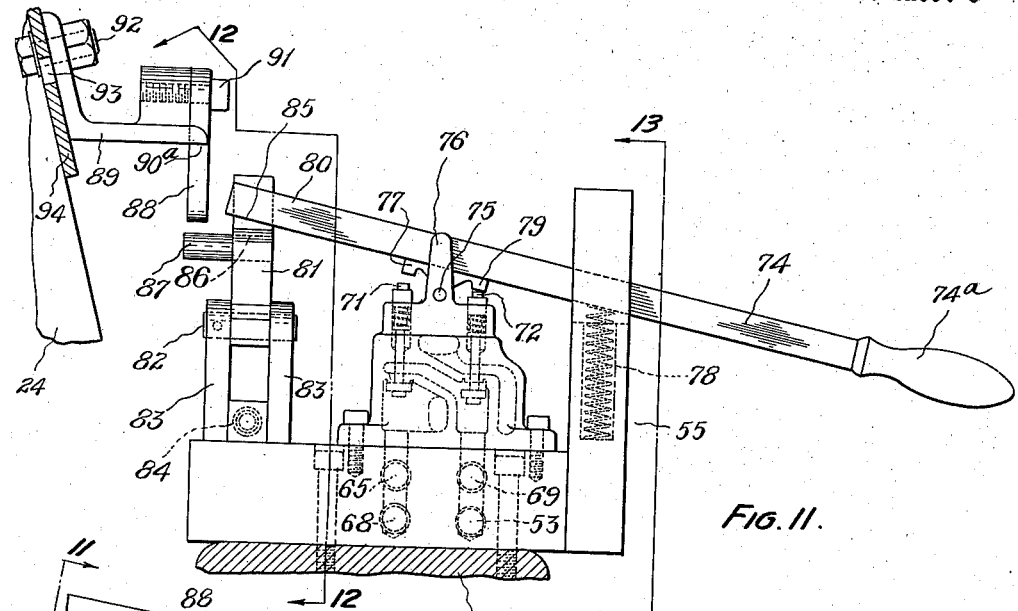
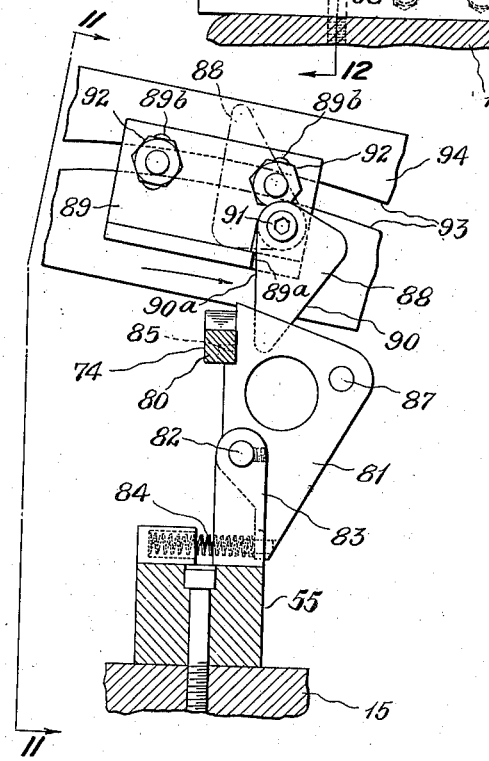
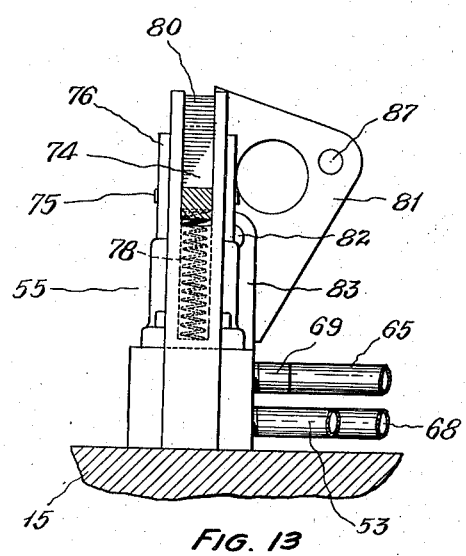
FIG. 11.
FIG. 12
FIG. 13
INVENTOR:
LAD L. HERCIK
ATTORNEY.

Patented May 4, 1948

2,440,799

UNITED STATES PATENT OFFICE 2,440,799

ALLIGATOR SHEAR CONTROL APPARATUS

Lad L. Hercik, Lakewood, Ohio

Application January 24, 1946, Serial No. 643,085

17 Claims. (Cl. 164—41)

This invention relates to machinery for shearing metals, and more particularly to open throated lever type shearing machines of the class generally known as alligator shears.

Machines of this class are used in steel mills, forge shops, structural shops and other places, for shearing flat, square, and round bars, angles, beams, rails and other shapes. Machines of this class are also used particularly in scrap yards for reducing to convenient size, relatively large and bulky objects usually made of sheet metal and partly hollow, such, for instance as automobile bodies, airplane frames and wings, metal containers and the like. These alligator shears are made with a very heavy elongated bed provided, intermediate its ends, with a king pin upon which a heavy shear arm is mounted. This shear arm is fitted at its forward end with a shear blade adapted to cooperate with a similar shear blade mounted in the forward end of the bed. The rear end of the shear arm is connected with power drive mechanism of any convenient type for oscillating or moving the shear arm to rock about the king pin as a pivot, thus moving the shear blade on the shear arm into cutting or shearing engagement with the blade on the bed.

Alligator shears may be operated either continuously or intermittently.

When shears are operated continuously the shear arm oscillates continuously and the work is positioned on the lower shear blade and is progressively advanced between cutting strokes of the shear arm in a direction transverse to the cutting edges of the shear blades.

In the intermittent operation of alligator shears it is customary to properly position the piece to be cut in the open throat of the shear when the forward end of the shear arm is stationary and in its fully raised position, and then cause the shear arm to move downwardly and cut the piece. After the completion of the cut the shear arm returns to its fully raised position, where it is automatically stopped to permit the piece to be readjusted prior to the next cutting stroke of the shear arm.

It will be apparent that, because of the necessarily heavy construction of the shear arm and associated parts, an appreciable time interval is required for the drive mechanism to get fully up to the speed at which the full effect of the power and momentum of the moving parts is made available at the shear blades. The need for this full effect of power and momentum naturally varies with the character of the pieces being sheared.

When, for instance, the piece to be cut consists of a relatively bulky hollow sheet metal part, the resistance to the downward movement of the shear blade is light at the start and gradually increases and is, in fact, never extremely heavy. If, however, the piece to be cut consists of a heavy solid bar, the full effect of all of the available power and momentum is required.

In shearing such heavy bars I have found that the power and momentum developed during the travel of the shear lever from its fully raised position to the shearing position is not sufficient to effectively shear the piece, resulting in frequent stalling of the machine. I have discovered, however, that when the shear arm is stopped during its upward stroke, a substantial distance short of its fully raised position and is subsequently caused to move thru a cycle of movement, first upwardly and then downwardly, the effectiveness of the cutting action at the end of the downward stroke, is materially increased. I have also found that the most desirable distance from its fully raised position at which the shear arm should be stopped varies for different pieces to be sheared. For a relatively heavy bar, for instance, the most desirable shear arm stop position is a position in which the shear arm blade stops, in its upward stroke, just above the bar to be sheared, in order that the shear arm may have the benefit of the momentum and power developed by the drive mechanism during the maximum portion of the upward swing of the shear in addition to the momentum and power effect developed during the downward swing. For a relatively large hollow piece the most desirable shear arm position is approximately at the top of the stroke in order that the maximum throat space may be available for receiving the largest piece possible.

I have also found that controls must be provided to effect the stopping of the shear arm in various positions in order to produce the best results under the various conditions pointed out above. Inasmuch as it is not ordinarily possible, in commercial use, to schedule large quantities of the same character of material to be processed on alligator shears, the controls must be quickly adjustable to permit the location of the stop position of the shear arm at the extremes pointed out above and at positions intermediate these extremes.

It will also be apparent that the shock incident to the shearing of a heavy bar is extremely severe. In the clutch mechanisms which have heretofore been used, this severe shock necessarily imposed severe strains and loads upon the driving mechanism, resulting in undue wear and maintenance. I have discovered that the introduction of flexible means in the drive mechanism materially reduces the wear and maintenance on the drive elements in particular, and on the machine in general.

It is accordingly a prime object of the invention to provide driving and stopping mechanisms, in conjunction with control means, whereby the starting and stopping positions of the shearing mechanism may be effected in a selective manner, and different action of the shearing mechanism obtained conforming to the requirements of the different types, natures and sizes of materials to be operated upon.

A further important object of the invention is to provide control means, whereby the positions of the driving and shearing mechanisms are controlled in such manner that the driving mechanism may be flexibly and operatively effectively engaged, and preliminary impetus and momentum imparted to the operating parts during a portion of the upward non-working stroke of the shearing mechanism as well as during a portion of the downward stroke thereof, preparatory to the actual shearing operation, thereby preliminarily conditioning the apparatus for more powerful and effective action in the actual shearing of heavy bar material.

Still another object of the invention is to employ pneumatically activated driving and stopping mechanisms, together with pneumatically operable control means, which may be either manually or automatically controlled, and continuously or intermittently operated dependent upon the type of actuation desired.

It is also an object of the invention to coordinate driving, shearing and brake mechanisms with a control means, whereby stoppage of the shearing mechanisms may be automatically effected when intermittent operation is desired.

A further and more specific object of this invention is to provide certain improvements in the details of control mechanism and interengaging parts for effecting the improved operating results pointed out above.

Another object of the present invention is to provide, in a machine of this type, pneumatically actuatable means which will produce a flexible but powerful and effective clutch and coupling action between the driving and shearing mechanisms, and which will operate to relieve the enormous shock stress and strains encountered in the operation of machines of this character, particularly when shearing heavy metal bars, and the like.

Another object of the invention is to provide pneumatically actuated brake means for stopping the operation of the machine at the times required and in rapid and positive yet flexible manner.

A further understanding of the construction and operation and of the manner in which the novel features effect the above and further objects, will become apparent from the following detailed description and the annexed drawings, which set forth certain means embodying this invention, such disclosed means constituting, however, but one of the forms in which the principle of this invention may be applied.

Referring to the annexed drawings:

Fig. 6 is a top plan view of the control mechanism employed in this invention, the view being enlarged and parts of the associated structure broken away, and being taken from a plane indicated by the line 6, 6 in Figures 1 and 8.

Figure 1:
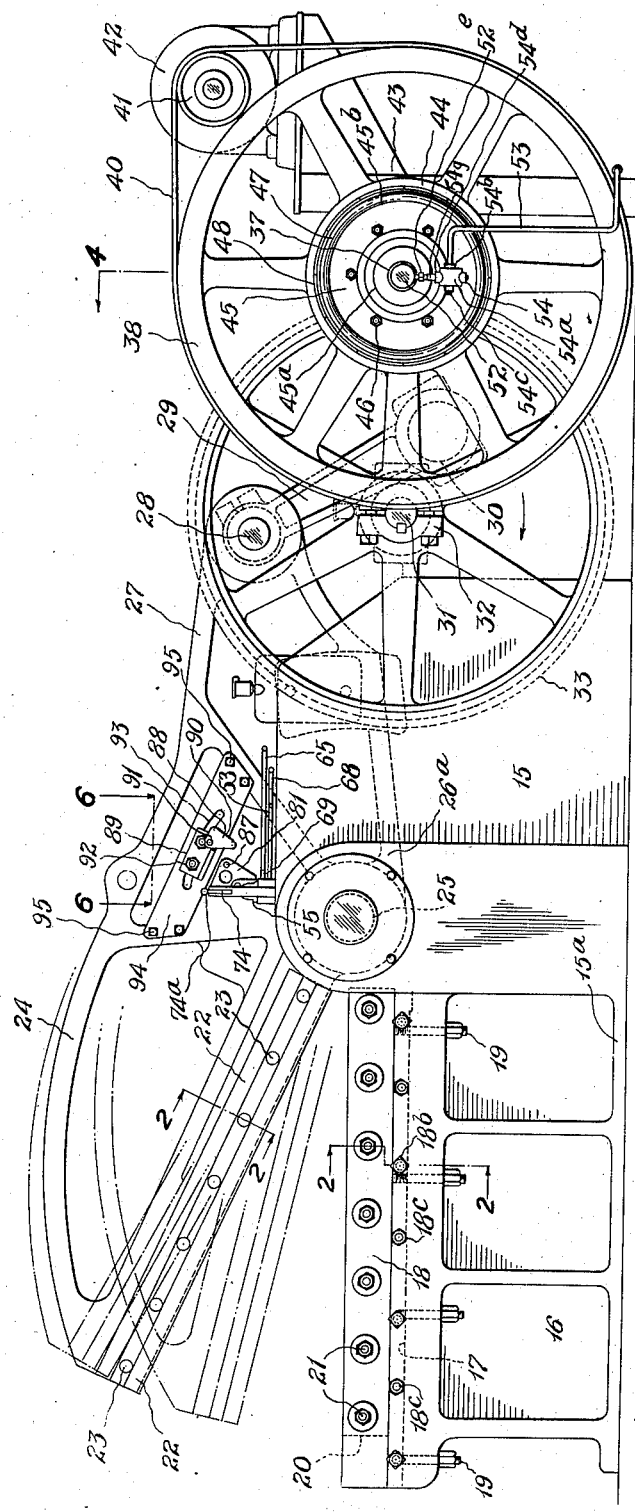
Fig. 1 is a side elevational view of an alligator shear embodying this invention, the shear arm of this shear being shown in full lines in one stopped position, and in broken lines in other stopped positions, the broken lines also indicating positions assumed by the shear arm at various instants in its oscillating arc of movement.

Fig. 7 is a side elevational view, partly in section, of the control mechanism, the view being taken from the plane indicated by line 7, 7, in Fig. 6, and showing, in full lines, the parts in the position which they occupy when the shear arm is stopped in the full line position shown in Fig. 1, a certain lever being shown in broken lines in the position which it occupies when the shear arm is moving.

Fig. 8 is a fragmentary vertical sectional view of the control mechanism taken on the plane corresponding substantially to line 8, 8 in Figure 7, and showing the parts in a position corresponding to the stopped position of the shearing arm, shown in full lines in Figure 1.

Fig. 9 is a detailed sectional view of a portion of the supporting structure of the control mechanism, taken on a plane indicated substantially by the line 9, 9 of Figure 7.

Fig. 10 is a view similar to Figure 8, showing the parts in a position just prior to the position of the parts shown in Fig. 8, and while a certain latch is in the process of being tripped, all just prior to the stopping of the shear arm.

Fig. 11 is a side elevational view of the control mechanism showing a certain operating handle in a position in which the shear arm is in a running position, that is just prior to the stopping of the shear arm, the operating handle being held in such position by a latch prior to being tripped, and the view being taken along a plane indicated by line 11, 11 of Figure 12.

Fig. 12 is a view similar to Figures 8 and 10, showing the latch in position prior to being tripped to release the operating lever, that is just prior to the position of the parts shown in Figure 10 and prior to the stopping of the shear arm, the view being taken from a plane indicated by line 12, 12 of Figure 11, and Fig. 13 is an end elevational view of a portion of the control mechanism, partly in section, and as viewed from the plane indicated by the line 13, 13 in Figure 11.

Figure 2:
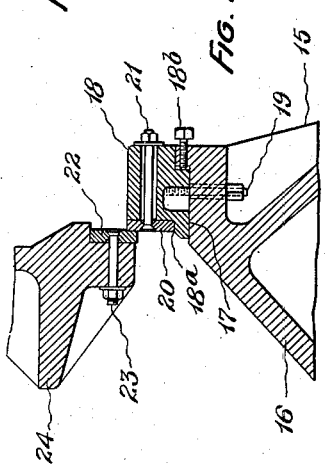
Fig. 2 is a fragmentary, vertical transverse sectional view of the cooperating shearing means per se, the parts being shown on planes corresponding substantially to the lines 2, 2 in Figure 1, these parts, however, being shown in cutting relation in this view instead of in the spaced relation shown in Figure 1.

As shown in the drawings, this improved alligator shear comprises a heavy elongated frame or bed 15, suitably braced with ribs and formed with a flanged base portion 15a adapted to rest on a suitable foundation or support. A forward portion 16 of the frame 15 is formed with a flanged seat 17 for the reception of a blade mount 18, the latter being held in position on the frame 15 and downwardly against the seat 17 by studs 19 tapped into the under side of the mount and passing thru slotted holes formed in the seat 17. The mount 18 is formed with a seat 18a for the reception of a shear blade 20, held in position by bolts 21 all as best shown in Figures 1 and 2.

Cooperable with the stationary shear blade 20, is a movable blade 22 preferably fixedly secured by bolts 23 to a lever or shear arm 24 mounted for oscillation relatively to the frame 15 upon a pivot or king pin 25.

In order to insure a satisfactory shearing clearance between the shear blades 20 and 22, in the first instance and subsequently for various types of work and for readjusting after grinding one or both of the shear blades, the mount 18 for the lower blade 20 is made laterally adjustable relatively to the frame 15 and laterally adjustable with respect to the shear arm 24. This adjustment is effected, after slightly loosening the nuts on the studs 19, by turning the set screws 18b to advance the mount toward the blade 22 on the shear arm 24 or by turning the cap screws 18c which pass thru the frame portion 16 and are threaded into the blade mount 18, to retract the mount from the blade 22, and then locking these set screws and cap screws against each other, whereupon the nuts on the studs 19 are tightened, all for the purpose of holding the mount 18 firmly in place in the desired adjusted position.

The shear arm 24 is rigidly fixed, axially and rotatably, to the king pin 25, the ends of which are rotatably supported in bosses 26a, 26b on the frame 15. The king pin is further provided with means to resist axial thrust preferably in the manner and of the type disclosed and claimed in my patent entitled Alligator shear, issued February 27, 1945 and bearing No. 2,370,311.

The shear arm 24 has a preferably integrally formed rearwardly disposed extension 27, the rear end of which is operatively connected by a wrist pin 28, with one end of a connecting rod 29, the opposite end of the connecting rod 29 having a rotatable connection with a crank pin 30 substantially centrally located, sidewise, in the shear frame and forming a part of a crank shaft 31.

Figure 3:
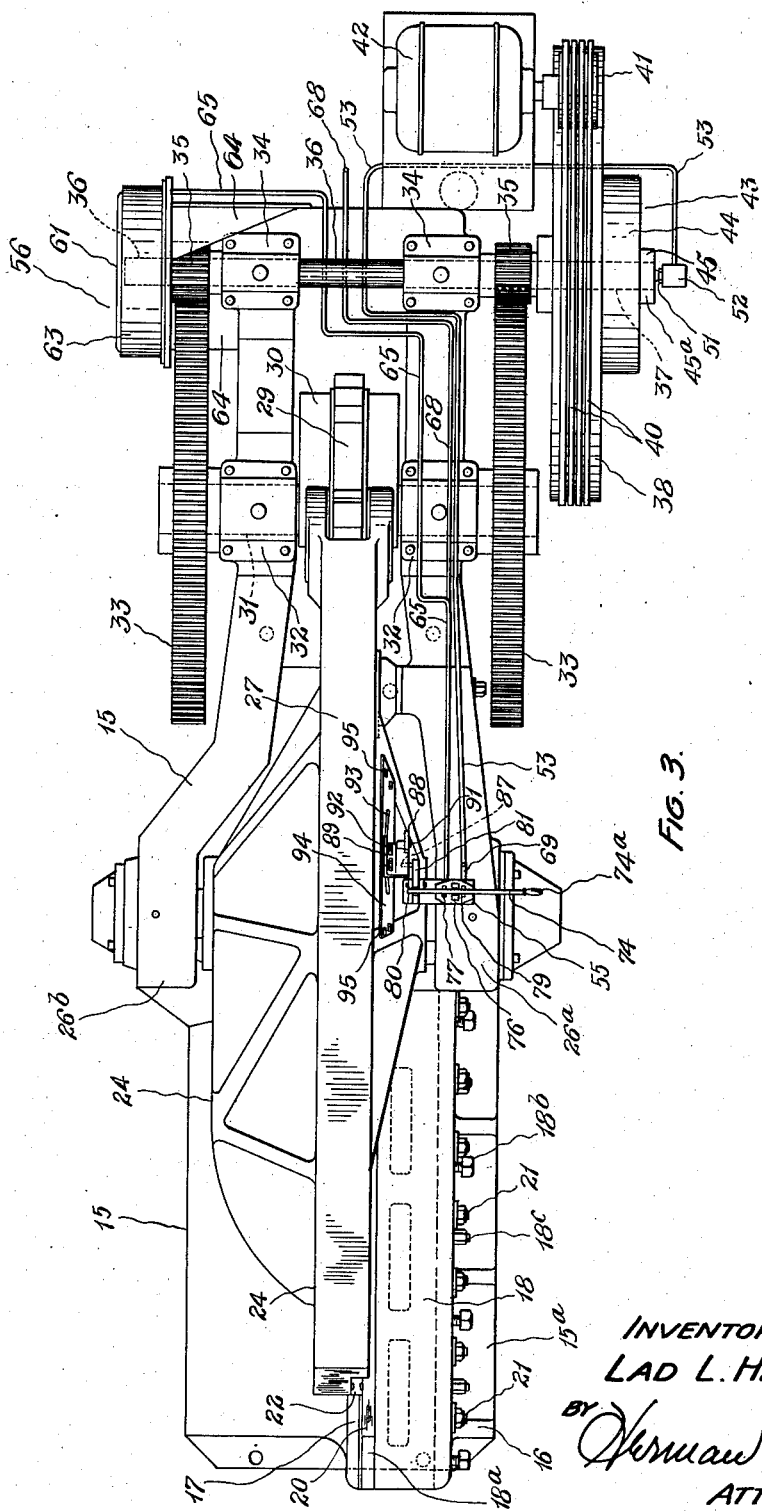
Fig. 3 is a top plan view of the alligator shear in the position shown in full lines in Figure 1.

The crank shaft 31 is mounted in suitable bearings 32, Figures 1 and 3, carried by the frame 15. To each of the outer ends of the crank shaft 31, which projects thru and beyond its associated bearing 32, is fixed a large spur gear 33. Each gear 33 is engaged and rotated by an aligned driving spur pinion 35, the pinions 35 being fixed to a driven countershaft 36, Fig. 4, rotatably mounted in suitable bearings 34, 34 on the frame 15 and axially fixed thereby to the frame 15. One end portion 37 of the shaft 36 carries a large and relatively heavy flywheel 38, the hub of which is rotatably supported upon the shaft 36 by antifriction bearings 39, while the outside periphery of the rim portion of the wheel 38 is engaged by a plurality of V-belts 40 driven by a suitably grooved V-belt pulley 41 mounted upon the shaft of, and driven by an electric motor 42.

Figure 4:
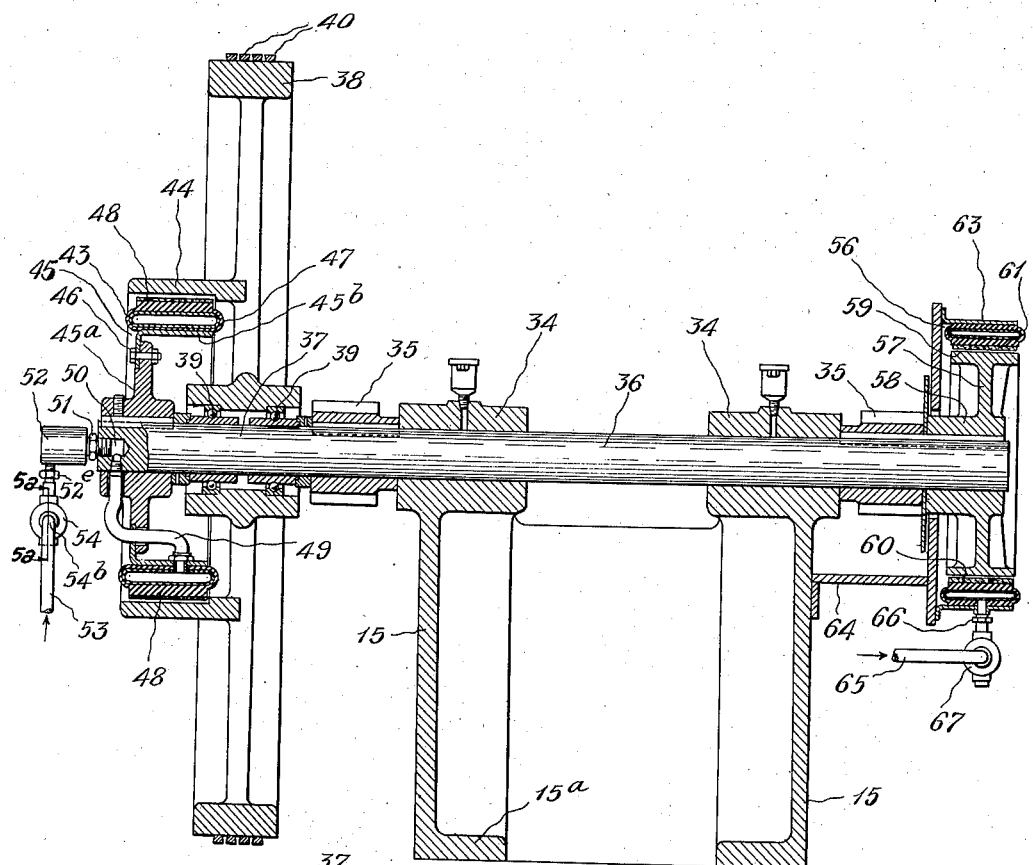
Fig. 4 is a vertical transverse sectional view of the apparatus taken on a plane corresponding substantially to the line 4, 4 of Figure 1.

A pneumatically operated flexible clutch or coupling mechanism, indicated in its entirety at 43, and best shown in Fig. 4, is employed for operatively connecting the flywheel 38 and the shaft 36. As shown, the flywheel includes a drum 44, having an inner cylindrical surface and mounted upon and preferably integrally formed with the flywheel 38. For the purpose of cooperating with the drum 44, a drum member 45 is mounted on the shaft 36, preferably of two part construction and comprising a hub portion 45a keyed to the shaft 36, and a cylindrical drum portion 45b having an outer cylindrical surface, positioned interiorly of and concentricaly with and spaced from the drum 44. The drum parts 45a and 45b are, in the construction shown, rigidly secured together by bolts 46.

Interposed between the inner cylindrical surface of the drum 44 and the outer cylindrical surface of the drum 45, is an annular inflatable tubular member 47. The member 47 is secured at its inner periphery to the outer surface of the drum portion 45b and is provided, at its outer periphery, with reinforced preferably rubber impregnated friction blocks or treads 48, adapted, when the member 47 is inflated or expanded, to frictionally engage the adjacent surface of the drum 44, and thus to firmly yet flexibly operatively couple or clutch the opposed cylindrical surfaces of the drums 44 and 45 together. Air under pressure is supplied to the member 47 thru a flexible hose 49, one end of which communicates with the member 47, while the opposite end communicates with an axially drilled chamber 50 formed in the adjacent end of the shaft 36, as most clearly shown in Figures 4 and 5.

Figure 5:
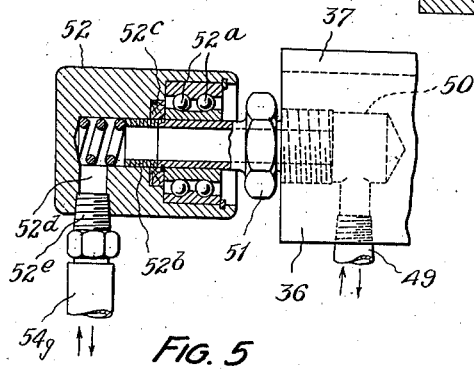
Fig. 5 is an enlarged, fragmentary vertical sectional view of an air conducting fitting employed in this invention forming an air passage between certain rotating and non-rotating parts.

A hollow tubular fitting 51, as best shown in Fig. 5, is threaded into the chamber 50, and supports a rotatably fixed generally cylindrical housing 52, by means of antifriction bearings 52a interposed between the fitting 51 and the wall of the housing 52 and locked in the housing. The housing 52 is formed with a central bore 52b closed at its outer end and alined with and communicating at its inner end with the bore in the fitting 51 and hermetically sealed therewith by means of packing elements 52c. Intersecting the bore 52b near the outer end of the housing 52 is a radial passage 52d into which is threaded a connector 52e forming connection with a quick release valve 54 which is, in turn, connected with a pipe 53 adapted to receive air from a source of air under pressure, thru a four-way valve mechanism, 55, of a type obtainable in the open market, the manner of incorporation and use of which will be described more fully hereinafter. The fitting 51, housing 52 and associated parts comprise a rotary seal adapted to transmit air under pressure from the stationary pipe 53 to the rotatable member 47, as will be understood.

Figure 5A:
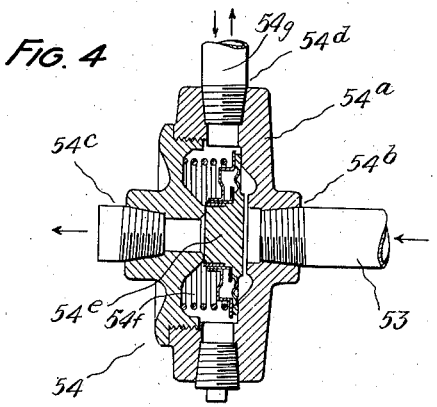
Fig. 5a is an enlarged, fragmentary vertical sectional view of a quick release valve used in this invention to speed the deflation of certain inflatable members forming part of the driving and braking mechanism, this view being taken on the plane indicated by line 5a, 5a in Fig. 4.

A quick release air valve 54, Figures 1, 4 and 5a is interposed in the air supply pipe adjacent the connection 52e, this valve 54 being of a well known type adapted to exhaust the pressure in the inflatable member 47 directly to the atmosphere at the quick release valve, instead of thru the valve control mechanism 55.

This valve 54, illustrated in section in Fig. 5a, consists of a body 54a, formed with an inlet 54b communicating with the pipe 53, an exhaust passage 54c and a delivery passage 54d communicating with the fitting 52e thru a connector 54g. Enclosed in the body is a shiftable valve member 54e adapted to alternately close and open the exhaust opening depending upon the presence or absence of pressure in the air supply pipe 53. This shiftable member 54e is normally spring pressed by means of a spring 54f, to close the the inlet 54b. When air pressure is supplied thru the line 53 the valve is shifted counter to the tension of the spring 54f, thus closing the exhaust passage and permitting air to pass thru the valve body 54a to the fitting 52e and thence to the inflatable member 47. As soon, however, as the pressure in the line 53 drops, the spring 54f, aided by the confined pressure in the member 47, shifts the valve member 54e to a position in which the exhaust port is opened thus releasing the air from the inflatable member to the atmosphere thru the exhaust passage 54c at the quick release valve, all to the end that the clutch 43 may be disengaged instantly as soon as the pressure is cut off from the line 53.

The pipe line 53 leads to and is adapted to receive air under pressure from the four-way valve mechanism 55.

The end of the shaft 36 opposite the end upon which the flywheel and pneumatic coupling or clutch mechanism are mounted, is equipped with a pneumatically operated brake mechanism, indicated in its entirety at 56. This mechanism comprises a drum member 57 having a cylindrical outer surface 59 and formed with a hub portion 58 keyed to the shaft 36. The surface 59 is adapted to be engaged by a reinforced preferably rubber impregnated friction block braking surface 60 located on the inner periphery of an annular inflatable or expansible member 61, similar in principle of operation to the member 47. The member 61 on its outer periphery is fixed to a stationary cylindrical drum or housing 63 concentric with and spaced from the surface 59 and carried by a bracket 64 secured to the frame 15. The air supply pipe 65 communicates with the interior of the member 61 by means of a connector 66 fixed to the drum 63 and a quick release valve 67, similar to the valve 54, and adapted to release the inflating air immediately upon the release of pressure in the pipe 65, is interposed in the pipe. The pipe 65 leads to the four-way valve mechanism 55 heretofore referred to.

The valve control mechanism 55, for controlling the operation of the clutch and brake mechanism, just described, includes a housing provided with an inlet chamber which gets its supply of compressed air thru an inlet pipe 68 leading from a suitable source of air under pressure and has an exhaust chamber from which air is vented to the atmosphere thru an exhaust outlet 69. Valve controlled passages within the housing selectively connect the air supply chamber with the brake expansible member 61 and the exhaust chamber with the clutch expansible member 47 or alternatively connect the air supply chamber with the clutch expansible member 47 and the exhaust chamber with the brake expansible member 61, depending upon the disposition of the valves. In the construction, as shown in the drawings, Figures 6, 7 and 11, four valves are provided in the valve mechanism 55, for controlling the passages within the housing. These valves are spring controlled and are normally held in a sealing position against seats formed in the body of the valve mechanism. Each of the valves is provided with a plunger indicated at 70, 71 and 72, 73, projecting vertically upwardly from the top of the housing.

The plungers 70, 71 and 72, 73 are adapted to be actuated and depressed in pairs to an open position thru the medium of a rocking lever 74. This lever is pivotally mounted as at 75, in a bracket 76 carried by the valve housing and is formed at the outer end remote from the shear arm with a hand grip 74a. At one side of the pivot 75 the lever 74 is provided with a pair of fingers 77 adapted, when the hand grip is tilted upwardly as shown in the full line position in Fig. 7, to simultaneously depress the plungers 70 and 71, the lever 74 being normally biased to this position by a spring 78, the valves controlled by the plungers 72 and 73 remaining closed. At the opposite side of the pivot 75, that is, on the hand grip side of the pivot 75, the lever 74 is provided with a second pair of fingers 79 for simultaneously depressing the plungers 72 and 73, when the hand grip end of the lever is tilted downwardly as shown in Fig. 11, the valves 70 and 71 remaining closed in this position of the lever 74.

With the lever 74 in the full line position, and depressing the valve plungers, as shown in Figure 7, and held in such position by the spring 78, the valves so control the air pressure that the brake member 61 is expanded and the clutch member 47 exhausted, under which conditions the shear lever and shear lever actuating parts of the machine are stationary, being in the positions in which they were stopped when the drive clutch was disconnected from the flywheel and the brake applied.

Movement of the lever 74 to the broken line position shown in Figure 7 changes the position of the air controlling valves to exhaust the brake member 61 and expand the clutch member 47, thus engaging the drive coupling 43 and disengaging the brake 56.

If it is desired to operate the shear arm continuously this can be effected by manually moving the lever 74 into the position shown in broken lines in Fig. 7, against the tension of the spring 78, which maintains the drive connection between the flywheel 38 and the shaft 36 and which maintains the brake in the released position.

As previously pointed out, however, this type of alligator shear is very frequently operated intermittently and mechanism is provided for automatically controlling the valve mechanism 55 to effect such intermittent operation. This mechanism includes an extension 80 at the inner end of the lever 74, adapted to cooperate with a latch 81, pivotally mounted upon a pin 82, between ears 83 carried at the inner end of the control mechanism 55. The latch 81 is roughly triangular in shape and is normally urged in a counterclockwise direction, as viewed in Figures 8, 10 and 12, about the pivot 82, by a spring 84 which engages a lower corner of the latch 81. An upper corner of the latch 81 adjacent to the lever extension 80, is cut out or recessed to form a shelf or seat 85 adapted to latch under the extension 80 when the extension is raised, thus to hold the lever 74 in the position shown in broken lines in Fig. 7, that is in the position in which the lever so controls the valves that the shear arm oscillates continuously. The latch has an inclined approach 86 below the seat 85 adapted to permit the camming of the latch by the lever extension 80 to supporting position. The latch 81 adjacent its remaining upper right corner, Figures 6, 7, 8, 10, 11 and 12, is provided with a trip pin 87 extending inwardly beyond the seat 85 of the latch 81 and beyond the inner end 80 of the lever 74. This pin 87 is positioned to intersect the path of movement of a tripping cam 88, carried by an angularly shaped bracket 89 attached to the shear arm 24 when the cam is in one of two alternate positions, as will appear from Figures 6 and 7.

This trip or cam 88 is substantially triangular in shape and has an inclined surface 90 adapted to engage or cam the pin 87 when the adjacent portion of the shear arm moves toward the open position, that is toward the right about the king pin 25, as viewed in Figures 1, 8, 10 and 12. The engagement of the cam with the pin 87 during this opening movement of the shear arm 24, moves the upper portion of the latch 81, and hence the seat 85 of the latch, in a clockwise direction. The surface 90a of the cam 88 during this action engages a shoulder 89a on the bracket 89, as clearly shown in Fig. 10. The latch 81, pivot 82, pin 87 and cam 88 are so arranged that the engagement of the cam 88 with the pin 87 continues until the seat 85 has moved laterally with respect to the lever extension 80 sufficiently to release the lever, subsequent to which the pin 87 due to its arcuate movement about the pivot 82 recedes from the path of the cam 88 and returns to its normal position, biased by the spring 84. This tripping action just described is progressively shown in Figures 12, 10 and 8, in the order indicated. The tripping cam 88 is pivotally mounted on a cap screw 91 fixed to the bracket 89, which pivotal mounting permits the cam 88 to tilt counterclockwise and slide over the pin 87 on the return or closing stroke of the shear arm. The pivotal mounting of the cam and the location of the pivot 91 also permits the cam to be tilted in a counterclockwise direction to a position shown in broken lines in Figure 12, in which the cam 88 is swung out of the path of the trip pin 87 and accordingly does not trip the latch 81 to release the lever 74, which thus effects continuous operation of the machine, when desired.

The bracket 89 is adjustably held in position by a pair of spaced bolts 92 passing thru vertical slots 89b in the bracket and extending thru an arcuate slot 93, concentric with the king pin 25 of the shear arm, and formed in a supporting plate 94, rigidly affixed to the shear arm by bolts 95. The bracket 89 may thus be adjustably positioned to present the tripping cam 88 at different positions on the shear arm with respect to the trip pin 87, and thus control the position or time in the oscillating cycle of the shear arm movement at which the cam 88 trips the catch 81, and hence control the position at which the shear arm 24 is stopped.

The operation of the control mechanism is as follows: Assuming the motor 42 to have been started and to have been run a sufficient time to get the flywheel 38 up to the desired speed and assuming the shear arm to be in a stopped position with the shear lever in an open throat position, under which conditions the operating lever 74 is in the full line position shown in Figure 7, and the valve plungers 70, 71 are held depressed by the fingers 77 under the bias of the spring 78 acting on the lever, the member 61 is in expanded condition, setting the brake mechanism 56, while the member 47 is deflated releasing the clutch mechanism 43.

Assume first that it is desired to oscillate the shear arm continuously with the intention of feeding the material to be cut progressively between oscillations. For such continuous running, the trip cam 88 is turned to an out of the way position, as shown in broken lines in Fig. 12. The grip portion 74a of the lever 74 is then depressed to the broken line position shown in Fig. 7 and the lever is held in that position by the latch 81. In this position of the lever 74, the valve plungers 72, 73 are depressed by the fingers 79, air pressure is applied to the member 47 and simultaneously air is exhausted from the member 61, thus engaging the clutch mechanism 43 and releasing the brake mechanism 56, the latch 81 moving to a position to hold the lever 74 in this position. Engagement of the clutch mechanism 43 sets the countershaft 36 in motion, which thru the pinions 35 and gears 33, rotates the crank shaft 31, and thru the crank and pitman connection, oscillates the extension 27 and hence continuously oscillates the shear arm 24. When it is desired to stop the shear arm, the cam 88 is manually moved from the up position, shown in broken lines in Fig. 12, to the full line position shown in that figure, and, at the first oscillation of the top of the shear arm in a right hand direction, the cam 88 engages the pin 87. The engagement of the cam 88 with the pin 87 moves the upper end of the latch 81 in a clockwise direction and releases the lever 74 which, biased by the spring 78, returns to its initial position, disconnecting the clutch mechanism 43 and reengaging the brake mechanism 56.

Assuming now that the shear arm is to be oscillated intermittently, that is moved thru one complete stroke or cycle and then stopped automatically to permit the work, especially heavy work, to be adjusted for the next stroke.

The apparatus may be set for such automatic stoppage thru the medium of the trip cam 88, when turned down from its out of the way position, as shown in full lines in Figures 8, 10 and 12.

In order to initiate a single stroke movement of the shear arm, the hand grip on the lever 74 is manually lowered until the portion 80 rests upon the seat 85 of the latch 81, as shown in the broken line portion in Figure 7, at which time the valve plungers 72, 73 are depressed by the fingers 79, air pressure is applied to the member 47 and simultaneously air is exhausted from the member 61, thus engaging the clutch mechanism 43 and releasing the brake mechanism 56 and starting the shear arm in motion. At this instant the position of the control parts is substantially as shown in Figure 8 and the initial movement of the cam member 88 will be to the left, if the shearing end of the shear arm was previously stopped at or past its upper dead center. If, however, the shear arm was previously stopped before its shearing end reached its upper dead center position, the initial movement of the cam 88 will be to the right until it reaches its dead center position, after which it will move to the left, as viewed in Figure 8. In either event, movement of the cam 88 to the left will not affect the position of the latch 81 or lever 74 as the pivoted cam 88 freely slides over the pin 87. After the shearing end of the shear arm has reached the bottom of its stroke, however, and the portion of the shear arm carrying the cam 88 moves to the right and reaches a position, such as shown in Figure 8, at which the cam 88 is positioned to engage the pin 87, the cam quickly causes the latch 81 to disengage the lever 74 as shown in Fig. 10.

The released lever 74 tilted under the influence of the spring 78, to the full line position shown in Figure 7, disengages the clutch 43 and applies the brake 56, as previously explained. The drive mechanism coasts slightly subsequent to the action just described, as a result of which the cam 88 slips past the pin 87 and the latch 81 returns to its latching position, shown in Figure 8.

The position of the trip cam 88 may be adjusted to vary the time in the cycle of movement of the shear arm at which the latch is tripped by the cam and at which the shear arm is stopped. This is effected by loosening the bolts 92 and moving the bracket 89 along the arcuate slot 93, and again tightening the bolts. A slight radial or vertical adjustment is also permissible by the slots 89a, to vary the length of the period of engagement of the cam 88 with the pin 87. The adjusted position of the parts as shown in Figure 8 will bring about stoppage of the shear arm 24 substantially in the position shown in full lines in Figure 1. When the bracket 89 is moved forwardly, that is to the left, as viewed in Figures 1 and 8, sufficiently along the slot 93, stoppage takes place approximately at the upper broken line position shown in Figure 1, that is, later in the upstroke. When the bracket 89 is moved rearwardly, that is to the right, stoppage takes place nearer the lower broken line position, that is earlier in the upstroke portion of the cycle.

Provision of the flexible pneumatic clutch 43 enables the tremendous shocks and strains incident to operation of a machine of this kind to be cushioned and absorbed, and the pneumatic type brake mechanism 56 cushions the shocks necessarily accompanying sudden and accurate stoppage.

Thru the pneumatic type of control means provided, close control and easy and safe operation are assured.

The automatic trip means enables the position of the shear arm 24, at the moment of stoppage, to be nicely controlled.

The feature of providing for the stoppage of the shear arm as early in the cycle as the size of the work will permit, is of prime importance for the reason that it is desirable to secure a firm engagement of the driving mechanism and to obtain a maximum of initial velocity and momentum of the moving parts prior to the encounter of the shearing blade on the shearing arm with heavy materials, such for example as heavy bars or shafts. When stoppage of the shear arm is effected at the lower broken line position shown in Figure 1, and the driving mechanism is again engaged, the front of the shear arm first moves to the top of its stroke and then begins its downward stroke, all before the actual cutting operation takes place, thus allowing time for firm engagement of the driving clutch parts and for a gain in velocity and an accumulation of momentum and flywheel effect of all parts and allowing time for a recovery from the retarding effect imposed on the flywheel and motor by the sudden engaging of the clutch.

It will be apparent to those skilled in the art that I have accomplished the principal objects of my invention, and it also will be apparent that the embodiment herein described may be variously changed and modified without departing from the spirit of the invention, and that the invention is capable of uses and has advantages not herein specifically described; hence it will be appreciated that the herein disclosed embodiment is illustrative only and that my invention is not limited thereto.

Certain features disclosed in this application and not claimed herein are claimed in my copending application, Serial No. 768,657, filed August 14, 1947 which copending application is a continuation-in-part of the present application.

What I claim is:

1. In an alligator shear, the combination with an oscillatable shear arm, of rotatable crank means for oscillating said shear arm, countershaft means for driving said crank means, a driven flywheel, and pneumatically actuatable flexible coupling means for operatively connecting said flywheel and said countershaft means, said coupling means including a drum mounted on said flywheel, a cooperative drum mounted on said countershaft means, said drums being concentrically positioned one within the other, and an inflatable means interposed between said drums and operable, when inflated, to form flexible drive means between said drums.

2. In an alligator shear, the combination with an oscillatable shear arm, of rotatable crank means for oscillating said shear arm, countershaft means connected in driving engagement with said crank means, means for driving said countershaft means, a rotatable drum carried by said countershaft means, and a stationarily mounted drum concentrically disposed relatively to said rotatable drum, and inflatable means imposed between said drums and operable, when inflated, to exert a braking effect upon said countershaft means.

3. In an alligator shear, the combination with an oscillatable shear arm, of crank means for oscillating said shear arm, countershaft means for driving said crank means, means adapted for driving said countershaft means, a pneumatically inflatable coupling means for operatively connecting said driving means and said countershaft means, pneumatically inflatable brake means for applying braking effect to said countershaft means, and interconnected control means for alternately inflating said coupling means and said brake means.

4. A construction as set forth in claim 3, in which the control means are normally biased to a position to inflate said brake means and deflate said coupling means.

5. A construction as set forth in claim 3, in which the control means are normally biased to a position to inflate said brake means and deflate said coupling means, in combination with latch means for holding said control means against the normal bias and in position to inflate said coupling means and deflate said brake means.

6. In an alligator shear, the combination with an oscillatable shear arm, of driving means for imparting oscillatory movement to the shear arm, braking means for arresting movement of said shear arm, control mechanism adapted in one position to effect engagement of said driving means and disengagement of said braking means, and in another position to effect a reverse action thereof, and actuating means, actuated thru movement of said shear arm, to shift said control mechanism to said other position.

7. In an alligator shear, the combination with an oscillatable shear arm, of driving means for imparting oscillatory movement to said shear arm, braking means for arresting movement of said shear arm, control mechanism adapted in one position to effect engagement of said driving means and disengagement of said braking means, and in another position to effect a reverse action thereof, and actuating means, actuated thru movement of said shear arm, to shift said control mechanism to said other position, said actuating means being adjustable to vary the position in the oscillating movement of the shear arm at which said control mechanism is shifted to said other position.

8. In an alligator shear, the combination with an oscillatable shear arm, of rotatable crank means operatively connected to said shear arm for imparting oscillatory movement thereto when said crank means are rotated, a countershaft operatively connected to said crank means, driving means for said countershaft, pneumatically actuatable means controlling operative connection of said driving means with said countershaft, pneumatically actuatable means adapted to arrest movement of said countershaft, interconnected control means operable, when shifted to different positions, to alternately actuate one or the other of said pneumatically actuated means, and means, dependent upon movement of said shear arm, for automatically shifting the position of said control means.

9. In an alligator shear, the combination with an oscillatorily movable shear arm carrying shearing means, of stationary shearing means adapted to cooperate with the shearing means on said shear arm in a cutting operation, rotatable crank means operatively connected with said shear arm, said crank means being so proportioned that approximately one-half revolution thereof effects a stroke of said shear arm in a cutting direction, and the other half revolution effects a non-working stroke of said shear arm in a non-cutting direction, means for driving said crank means, and mechanism for stopping said shear arm following the cutting operation before said shear arm reaches the limit of its non-working stroke, whereby the succeeding cutting operation utilizes more than one-half revolution of said crank means to move said shear arm to the cutting position.

10. In an alligator shear, the combination with an oscillatable shear arm carrying shearing means, of stationary shearing means adapted to cooperate with the shearing means of said shear arm in a cutting operation, rotatable crank means operatively connected with said shear arm, said crank means being so proportioned that approximately one-half revolution thereof effects a stroke of said shear arm in a cutting direction, and the other half revolution effects a non-working stroke of said shear arm in a non-cutting direction, a driven countershaft operatively connected with said crank means, a driven flywheel, pneumatically actuatable clutch means for operatively connecting said flywheel and said countershaft, and mechanism for disconnecting said clutch means and stopping said shear arm following the cutting operation before said shear arm reaches the limit of its non-working stroke.

11. In an alligator shear, the combination with an oscillatable shear arm, of rotatable crank means operatively connected to said shear arm, means for driving said rotatable means, pneumatically actuatable clutch means, operable when expanded to connect said driving means and said rotatable means, and when exhausted to disconnect the same, pneumatically actuatable brake means, operable when expanded to arrest movement of said rotatable means, and when exhausted to release the same, valve means for controlling said pneumatically actuatable means, including a plurality of valves adapted to selectively open and close passages communicating with said pneumatically actuatable means, said valves, when placed in a first position being adapted to exhaust the clutch means and expand the brake means and when placed in a second position to expand the clutch means and exhaust the brake means, a lever pivoted at a point adjacent said valves, said lever having means operable when said lever is rocked in one direction to place said valves in said first position and when said lever is rocked in the opposite direction to place said valves in said second position, means normally biasing said lever to effect placing of said valves in said first position, latch means operable to hold said lever in position to effect placing of said valves in said second position, and trip means carried by said shear arm for tripping said latch means.

12. A construction as set forth in claim 11, in which the trip means are adjustable with respect to said shear arm to vary the position in the oscillating arc of the shear arm at which the latch means are tripped by said trip means.

13. In an alligator shear, the combination with an oscillatable shear arm, driving means for imparting oscillating movement to said shear arm, means for arresting movement of said shear arm, control means including a lever movable to a first position to connect said driving means and disconnect said arresting means, and movable to a second position to disconnect said driving means and engage said arresting means, said lever being biased toward said second position, latch means for releasably locking said lever when the same is moved to said first position, said latch means carrying a trip member, and a second trip member carried by said shear arm and adapted upon movement of said shear arm in one direction to trip said latch means to release said lever.

14. A construction as set forth in claim 13 in which one of said trip members may be turned to an out of the way position to clear said other trip member.

15. In an alligator shear, the combination with an oscillatable shear arm, driving means for imparting oscillating movement to said shear arm, means for arresting movement of said shear arm, control means, including a lever movable to a first position to connect said driving means and disconnect said arresting means, and movable to a second position to disconnect said driving means and connect said arresting means, said lever being biased toward said second position, latch means adapted to releasably lock said lever when moved to said first position, a slot formed on the shear arm, a bracket supported on the shear arm and adjustable along said slot, and a trip member carried by said bracket and adapted upon movement of said shear arm in one direction to trip said latch means to release said lever.

16. In an alligator shear, the combination with a shear arm oscillatable about a pivot, driving means for imparting oscillating movement to said shear arm, means for arresting movement of said shear arm, control means including a lever movable to a first position to operatively connect said driving means with the shear arm and disconnect said arresting means therefrom, and movable to a second position to disconnect said driving means from the shear arm and connect said arresting means therewith, said lever being biased toward said second position, latch means adapted to releasably lock said lever when moved to said first position, an arcuate guide means provided on the shear arm, said guide means being substantially concentric with said pivot, a bracket adjustably supported along said guide means, and a trip member carried by said bracket and adapted, upon movement of the shear arm in one direction, to trip the latch means to release the lever.

17. In an alligator shear the combination with a shear arm oscillatable about a pivot, driving means for imparting oscillating movement to said shear arm, means for arresting movement of said shear arm, control means including a lever movable to a first position to operatively connect said driving means with the shear arm and disconnect said arresting means therefrom, and movable to a second position to disconnect said driving means from the shear arm and to connect said arresting means therewith, said lever being biased toward said second position, latch means adapted to releasably lock said lever when moved to said first position, said latch means carrying a trip finger, a mounting fixed to said shear arm provided with an arcuate slot substantially concentric with the pivot, a bracket supported on said mounting and adjustable along said arcuate slot, and a trip member carried by said bracket and adapted, upon movement of said shear arm in one direction, to trip said trip finger on said latch means to release said lever.

LAD L. HERCIK.